May 19, 1931.  R. F. KOHR  1,806,296
BRAKE
Filed June 23, 1927   2 Sheets-Sheet 1
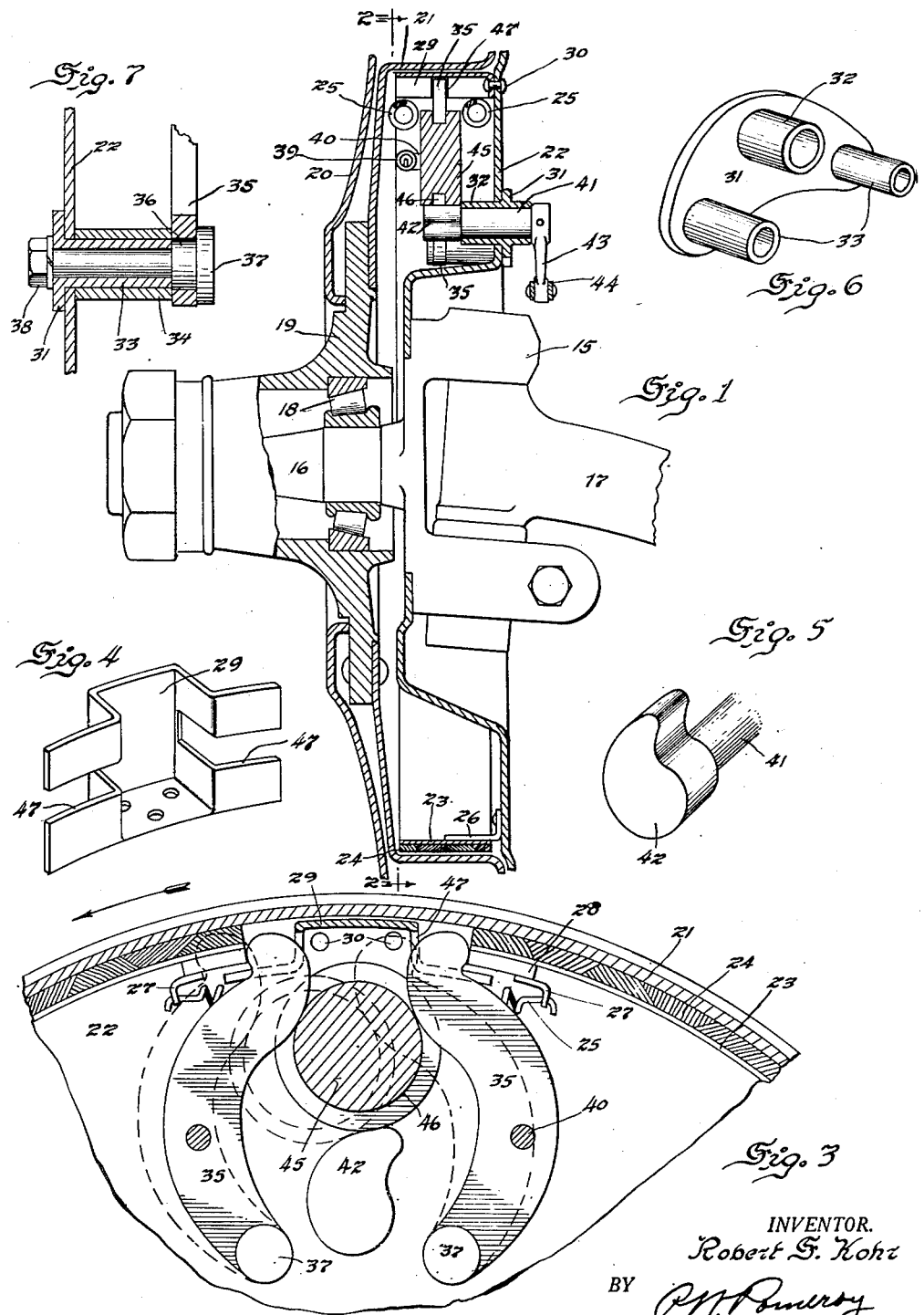
INVENTOR.
Robert F. Kohr
BY
ATTORNEYS.

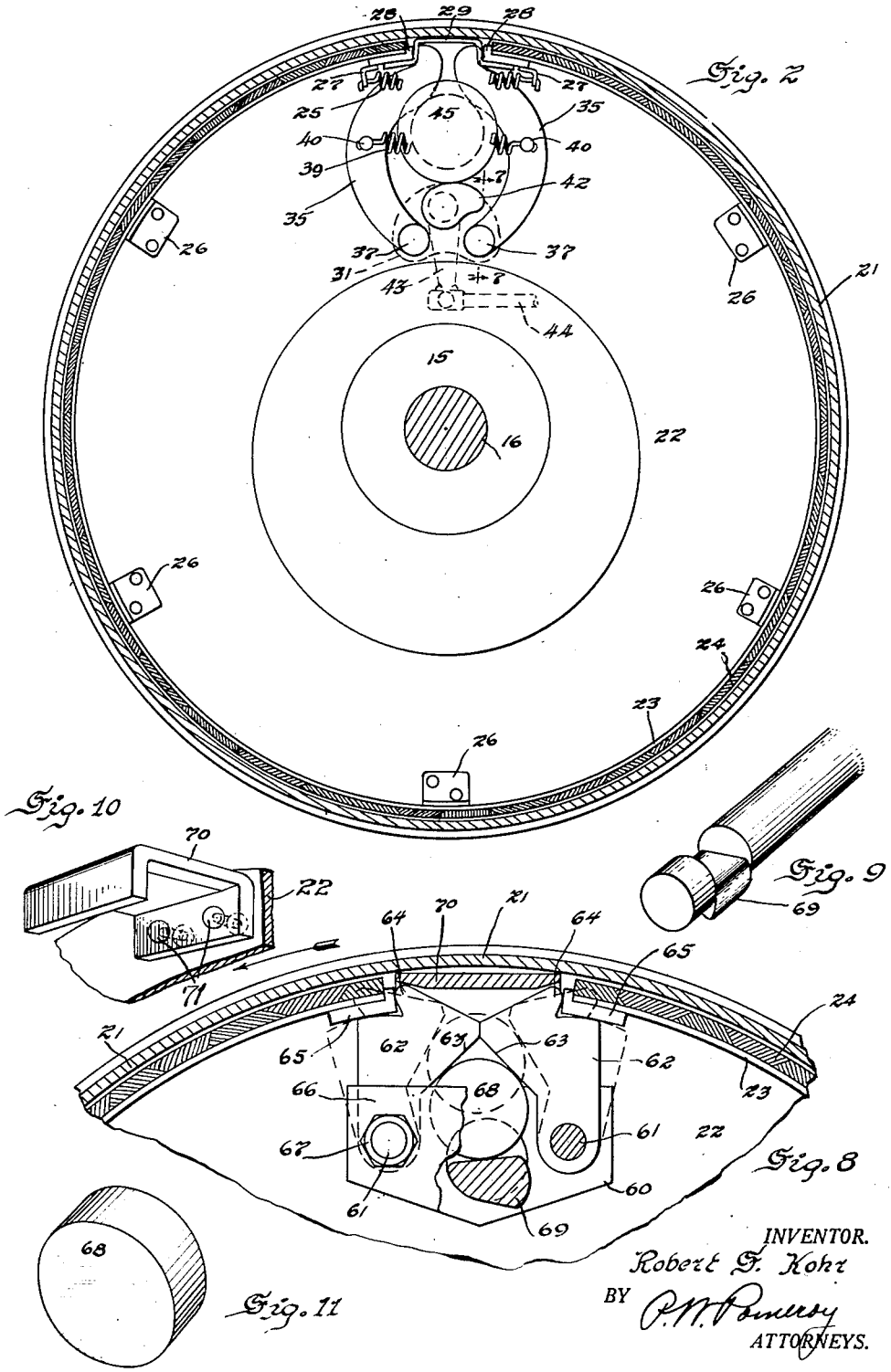

Patented May 19, 1931

1,806,296

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed June 23, 1927. Serial No. 200,944.

This invention relates to vehicle brakes and particularly to the operating mechanism therefor.

The principal object of the present invention is to provide a vehicle brake with an operating mechanism which will engage the brake with the brake drum as efficiently when the drum is rotating in a clockwise direction as when it is rotating in a counter-clockwise direction.

Another object is to provide a vehicle brake with an operating mechanism which will expand the brake into engagement with the brake drum in a direction circumferentially of the drum.

Another object is to provide a vehicle brake with an operating mechanism which engages the brake element substantially in the circular path thereof for expanding the brake element in a circumferential direction into engagement with the rotating brake drum.

Another object is to provide a vehicle brake with an operating means comprising a pair of pivoted levers and a free floating roller engaging both levers for moving the same to expand the brake element into frictional engagement with the brake drum.

A further object is to provide a vehicle brake with an operating mechanism comprising a pair of pivoted levers engaging the ends of the brake element substantially in the circular path thereof, a free floating roller engageable with both levers and an eccentric for moving the roller radially outwardly to pivot the levers in order to expand the band in a circumferential direction into frictional engagement with the brake drum.

These being among the objects of the present invention, the same consists of certain features of construction and combinations of parts to be hereinafter described with reference to the accompanying drawings and then claimed, having the above and other objects in view.

In the accompanying drawings, which illustrate a suitable embodiment of the present invention, Figure 1 is a vertical transverse section taken through the left front wheel of the motor vehicle showing the brake operating mechanism.

Figure 2 is a section taken on the line 2—2 of Figure 1 more clearly showing the brake expanding mechanism.

Figure 3 is an enlarged fragmentary section similar to Figure 2, showing the position of the brake expanding mechanism when the brake is first engaged with the drum and showing the same in dash and dot outline when the brake is fully engaged with the drum.

Figure 4 it an enlarged perspective view of the brake band stop member.

Figure 5 is an enlarged perspective view of the brake cam.

Figure 6 is an enlarged perspective view of the cam shaft support.

Figure 7 is a section taken on the line 7—7 of Figure 2.

Figure 8 is a fragmentary section similar to Figure 2 showing a modification of the present invention.

Figure 9 is a perspective view of the cam for the modified construction.

Figure 10 is a perspective view of the stop member and a portion of the dust cover for the modified construction.

Figure 11 is a perspective view of the lever operating roller for the modified construction.

Referring to the accompanying drawings in which like numerals refer to like parts throughout the several views, a conventional steering knuckle 15 having a stub axle 16 formed thereon is pivoted to a front axle 17. Mounted on the stub axle 16 is a bearing 18 which supports the rotatable wheel hub 19 on which the vehicle wheel 20 and the brake drum 21 are concentrically arranged and secured. A brake drum dust cover 22 is secured to the knuckle 15 adjacent to the brake drum 21 to provide a support for the brake mechanism.

As shown in Figure 2, a thin-sectioned steel brake band 23 faced with suitable friction material 24 is concentrically arranged within the brake drum 21 and is normally held in spaced relationship therefrom by a pair of coil springs 25 which tend to draw the ends of the same inwardly toward each other. L-shaped guides 26 spaced at regular intervals and secured to the dust cover 22 contact with the inner surface of the band 23 to regulate the amount of contraction of the same. The ends of the springs 25 are hooked through small brackets 27 secured to rectangular contact blocks 28 attached to the extreme ends of the band 23. The coil springs 25, as just mentioned, contract the band 23 and draw the ends of the same toward each other until the contact blocks 28 abut against the side walls of a stop member 29 secured to the dust cover 22 by rivets 30.

Suitably secured to the outer side of the dust cover 22 is a support 31 having an inwardly extending tubular portion 32 and two similar tubular portions 33, each of which projects through the dust cover 22. Mounted on each of the tubular portions 33 is a cylindrical spacer 34, one end of which abuts against the dust cover 22 and the other end of which abuts against a lever 35 which is pivoted on the shoulder 36 of a bolt 37 extending through the tubular portion 33 of the support 31. A nut 38 threaded on the bolt 37 draws the shoulder 36 thereof against the end of the tubular portion 33, and the spacer 34 retains the lever 35 in pivoted position on the shoulder 36. Each of the levers 35 are shaped to the form of an annular semi-circle and the free ends thereof are provided with reversely curved tips which contact with the blocks 28 secured to the ends of the brake band 23 as near the circular path of the band 23 as the construction of the mechanism permits. A coil spring 39, the ends of which are hooked through openings in projecting pins 40 secured to the levers 35 normally tend to draw the free ends of the levers 35 toward each other. A shaft 41 is received in the tubular portion 32 and has the cam 42 shown in perspective in Figure 5 formed at one end and positioned between the levers 35, and has a lever 43 secured to the other end, the end of which is pivoted to a brake rod 44 that is connected with some source of braking pressure such as a conventional brake pedal.

A free floating roller 45 having a circumferential groove 46 rectangular in cross section is positioned between the levers 35 and is seated on the curved face of the cam 42. The levers 35 are received in the groove 46 of the roller 45, which is sufficiently wider than the thickness of the levers 35 to permit sliding contact therebetween. The brake band stop 29, as shown in perspective in Figure 4, is provided with slots 47 at its ends for slidably receiving the upper ends of the levers 35.

In Figure 2 the position of the brake mechanism is shown when in inoperative position. The band 23 is contracted and the inner surface thereof is seated against the guides 26 and the ends thereof are contacting with the stop 29 and seated on a portion of the same. When the brake is operated the several parts thereof first assume the position shown in Figure 3. Rotation of the cam 42 causes the curved face thereof to slide on the roller 45 and move the roller radially outwardly. Movement of the roller 45, because the bottom of the groove 46 contacts with the faces of the levers 35, forces the levers 35 to rotate in opposite directions about their pivot bolts 37 against the tension of the spring 39 and expand the band 23 into engagement with the rotating drum 21, which in this case is rotating in a counter-clockwise direction, as viewed in Figure 2. At the instant the friction facing 24 engages the drum 21, the band 23 rotates with the drum 21 until the right end of the band abuts against the right side of the stop member 29. This causes both levers 35 to rotate in a counter-clockwise direction and further radial movement of the cam 42 causes the roller 45 to pivot the left lever 35 and rotate the same in a counter-clockwise direction to expand the band 23 in a circumferential direction into further frictional engagement with the drum 21 to retard the rotation thereof, the right lever 35 being held against rotation on movement of the roller 45 by the resistance of the right end of the band 23 to expansion in a clockwise direction.

The parts of the mechanism are shown in dash and dot outline in Figure 3 when the brake has assumed the position just described. The brake mechanism works in the same manner when the brake drum 21 is rotating in a clockwise direction with the exception that the left end of the band 23 engages the left side of the stop 29 and the right end of the band 23 is moved for expansion. It can be seen that the band 23 will be expanded into engagement with the drum 21 in a circumferential direction because each of the levers 35 contacts with the block members 28 on lines approximately in the circular path of the band 23.

A modification of the present invention is shown in Figure 8 and comprises a support 60 secured to the dust cover 22 upon which two pins 61 are mounted. The pins 61 support two pivoted levers 62 having inclined faces 63 and having lips 64 which engage the band end brackets 65 directly in the circular path of the band 23. A plate 66 is retained on the pins 61 by nuts 67, which holds the levers 62 against the support 60 to prevent transverse movement of the same. A cylindrical roller 68 is positioned between the support 60 and the plate 66 and is guided therebetween when it is moved radially outwardly by a rotatable cam 69 to contact with the inclined faces 63 of the levers 62.

In normal inoperative position, as shown in Figure 8, the levers 62 contact with each other to act as stops for the ends of the band 23, but in operative position, as shown in dash and dot outline in Figure 8, one end of the band 23 depending upon the direction of rotation of the drum 21 is held against rotation by a U-shaped stop 70 interposed between the ends of the bands 23 and secured to the dust cover 22 as by the rivets 71. Except for this one condition, the modified form of brake operates in the same manner as the construction previously described.

It can be seen that the maximum efficiency of an internal expanding band brake is obtained in the present invention by expanding the band in a circumferential direction by exerting pressure against the ends of the same substantially in the circular path thereof.

It is understood that the present invention is not limited to the particular shapes of the operating levers shown, but covers broadly the idea of operating the levers by a free floating member interposed therebetween.

Formal changes may be made in the specific embodiment of the invention described without departing from the spirit and substance of the broad invention, the scope of which is commensurate with the appended claims.

What I claim is:

1. In a brake mechanism, a rotatable drum, braking means movable to engage said drum, a pair of members engageable with said braking means, and an unattached means engaging said members for actuating one or both of said members to move said braking means into engagement with said drum.

2. In a brake mechanism, a rotatable drum, braking means movable to engage said drum, an actuating means for said braking means comprising a pair of pivoted levers engageable therewith, and an unattached member engaging said levers for pivoting one or both of said levers to move said braking means into engagement with said drum.

3. In a brake mechanism, a rotatable drum, braking means engageable therewith, pivoted levers engaging said braking means, an unattached member engaging said levers, and a rotatable cam for moving said unattached member to pivot said levers for engaging said braking means with said drum.

4. In a braking mechanism, a rotatable drum, braking means movable to engage said drum, and actuating means therefor comprising a pair of pivoted levers engaging the ends of said braking means, an unattached member positioned between and slidably engaging both of said levers, and a rotatable cam for moving said member to pivot said levers in opposite directions for moving said braking means into engagement with said drum.

5. In a brake mechanism, a rotatable drum, a split circular band movable to engage said drum, an expanding means for said band comprising a pair of pivoted levers engaging the free ends of said band, a roller having a circumferential groove therein positioned between said levers with the bottom of said groove contacting with the inner faces thereof, and a rotatable cam for moving said roller to pivot said levers in opposite directions for expanding said band into engagement with said drum.

6. In a brake mechanism, a rotatable drum, a split circular flexible band movable to engage said drum, and expanding means for said band comprising a pair of pivoted levers engaging the ends of said band substantially in the circular path thereof, a rotatable cam, and a free floating roller having a circumferential groove therein receiving and contacting with the inner faces of said levers and supported by said cam, whereby movement of said cam causes said roller to move between said levers to pivot one or both thereof for expanding said band into frictional engagement with said drum to retard rotation thereof.

7. In a brake mechanism, a rotatable drum, a brake element movable to engage said drum, and actuating means for said brake element comprising a pair of pivoted levers engaging said brake element, the inner faces of said levers converging toward each other, a free floating roller engaging said faces, and an eccentric for moving said roller between said converging faces to pivot one or both of said levers for engaging said brake element with said drum.

8. In a brake mechanism, a rotatable drum, a brake element movable to engage said drum, an actuating means for said brake element comprising a pair of pivoted levers engaging the free ends of said brake element the inner faces of said levers converging toward each other at their free ends, a free floating roller provided with a groove receiving said inner faces of said levers, and a rotatable cam for moving said roller between said converging faces for pivoting said levers to engage said brake element with said drum.

9. In a brake mechanism, a rotatable drum, a free floating brake element movable to engage said drum, a stop member between the ends of said brake element, a pair of pivoted levers engaging said brake element, a bodily movable roller contacting with the inner faces of said levers, and a cam for supporting and moving said roller betwen said inner faces to pivot said levers in opposite directions to engage said brake element with said drum, engagement of said element with said drum causing said element to rotate therewith until one end of said element abuts against the adjacent side of said stop member to prevent rotation of said element, further movement of said roller by said eccentric pivoting one of said levers to move said element into further engagement with said drum.

10. In a brake mechanism, a rotatable drum, braking means movable to engage said drum, having in combination therewith, actuating means for said braking means comprising, a pair of pivoted levers engageable with said braking means, and an unattached member movable to simultaneously actuate said levers.

11. In a brake mechanism, a rotatable drum, braking means movable to engage said drum, having in combination therewith actuating means for said braking means comprising, a pair of pivoted levers engageable with said braking means, and unattached means movable to separate the free ends of said levers for engaging said braking means with said drum.

12. In a brake mechanism, a rotatable drum, a split circular band movable to engage said drum, actuating means for expanding said band into engagement with said drum comprising, a pair of pivoted levers engageable with the free ends of said band, an unattached member engaging said levers, and a cam actuating on said unattached member to actuate said levers.

13. In a brake mechanism, a rotatable drum, a split circular band movable to engage said drum, actuating means for expanding said band into engagement with said drum comprising, a pair of pivoted levers engageable with the free ends of said band, a cam, and an unattached member movable radially relative to said drum for actuating one or both of said levers.

14. In a brake mechanism, a rotatable drum, a split circular band movable to engage said drum, actuating means for expanding said band into engagement with said drum comprising, a pair of pivoted levers engageable with the free ends of said band, a manually operated member, and an unattached member movable radially relative to said drum by said manually operated member for separating the free ends of said levers to move said band into engagement with said drum.

Signed by me at South Bend, Indiana, this 20th day of June, 1927.

ROBERT F. KOHR.